No. 702,821. Patented June 17, 1902.
G. M. PORTMAN.
METHOD OF MAKING RETORT RAKES.
(Application filed Feb. 27, 1902.)
(No Model.)
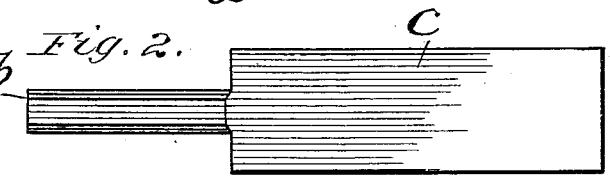
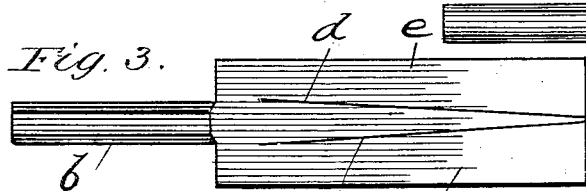
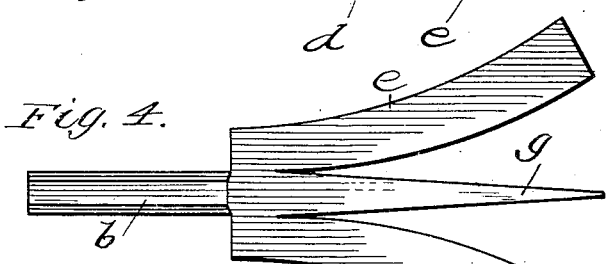
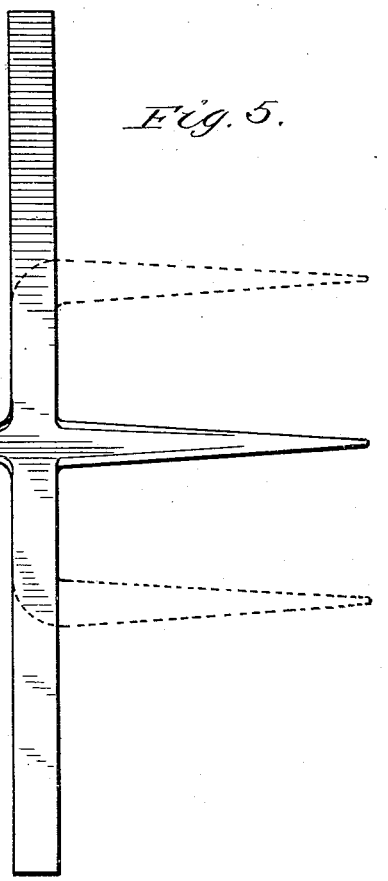
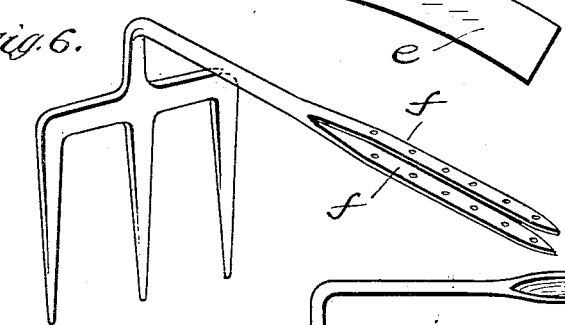
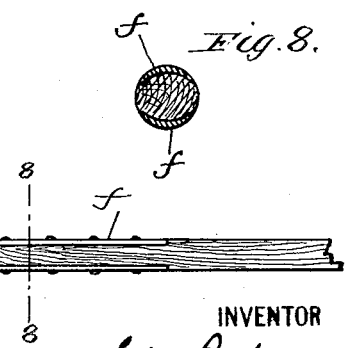
WITNESSES:
J. W. E. Criswell.
T. C. Glorin.
INVENTOR
G. M. Portman.
BY Davis & Davis
ATTORNEYS.

UNITED STATES PATENT OFFICE.

GILES M. PORTMAN, OF WESTLINE, PENNSYLVANIA.

METHOD OF MAKING RETORT-RAKES.

SPECIFICATION forming part of Letters Patent No. 702,821, dated June 17, 1902.

Application filed February 27, 1902. Serial No. 95,899. (No model.)

*To all whom it may concern:*

Be it known that I, GILES M. PORTMAN, a citizen of the United States, and a resident of Westline, county of McKean, and State of Pennsylvania, have invented certain new and useful Improvements in Methods of Manufacturing Retort-Rakes, of which the following is a specification, reference being had therein to the accompanying drawings, in which—

Figure 1 is a face view of a bar of steel from which the rake is forged. Fig. 2 is a similar view showing a portion of the bar forged to form the handle-shank. Fig. 3 is a similar view showing the manner of cutting the body of the bar to form the tines of the rake. Figs. 4 and 5 show the manner of bending outward the outer-tine-forming sections. Fig. 6 is a perspective view of the completed rake. Fig. 7 is a side elevation thereof, showing the rake attached to its wooden handle; and Fig. 8 is a detail cross-sectional view taken on the line 8 8 of Fig. 7.

The object of this invention is to provide a simple art or method whereby the rake and its shank may be forged inexpensively and expeditiously from a single plate of metal, as more fully hereinafter set forth.

The first operation in this method is to cut the blank transversely, as shown in dotted lines $a$ in Fig. 1, to permit of the folding inward of a portion of each longitudinal edge of the blank to form the handle-shank, this shank being forged to the shape shown at $b$ in Fig. 2. The main portion $c$ of the blank is then cut as shown at $d$ in Fig. 3. It will be noted that this cut forms a central V-shaped section $g$, the point of which forms the point of the middle tine of a three-tined fork, the base of the V-shaped section being a suitable distance from the inner end of the handle-shank, this distance being the thickness or width of the rake-head. The point of the V-shaped section is in axial alinement with the longitudinal center of the handle-shank. In a three-tined fork this V cut gives to the center tine its proximate shape and makes it a very simple operation to complete the forging of said center tine. It will be also noted that by making this cut the free ends of the outer sections $e$ of the blank will be broader than the ends connected to the head portion of the rake-blank. It is desirable that the free ends of these outer portions contain a greater amount of metal than the upper ends in order to provide sufficient metal at the right point in the blank to permit of the convenient forging of the outer tines. The outer sections are bent outward away from the center tine in the manner shown in Fig. 4. After they have been bent or forged into a position to bring their outer edges to form a continuation of the outer edge of the head portion of the blank said sections are compressed or forged to bring their longitudinal edges parallel to each other, as shown in Fig. 5. This forging of these sections lengthens them, as is evident, and brings them into condition to permit of their being bent downward to form the outer tines. It will be readily seen that by having the greater amount of metal at the free ends of the outer sections $e$ the forging of said sections into the outer tines and the proper spacing of said tines from the inner tine will be a very simple operation. It will also be noted that by cutting the central section originally in V shape the center tine is at once formed and only sufficient forging is necessary to shape up said tine.

The handle-shank is forged until the proper diameter is obtained and the shank is lengthened sufficiently. This shank is then bent at right angles to the plane of the tines of the fork at a point a sufficient distance from the head thereof, and the free end of this bent-over portion is then split, and the two leaves or sections $f$ of this split portion are concave to receive between them the rounded end of the usual rake-handle, said handle being secured therebetween by means of rivets or other suitable fastening devices, which pass through the leaves and the handle.

It will thus be seen that a rake having great strength may be forged from one strip or bar of steel with a minimum of labor, the metal of the blank being so distributed by means of the peculiar manner of cutting the blank that the subsequent forging operations will be rendered very simple.

Having thus described my invention, what I claim as new, and desire to secure by Letters Patent, is—

The art of manufacturing rakes from single blanks or plates of sheet metal of a substantially oblong shape, consisting in cutting the longitudinal edges of the blank transversely at opposite points, folding the opposite longitudinal edges of the plate over upon the main part of the plate and forging said folded parts and main part into a homogeneous shank portion and at the same time lengthening said shank portion, then bending it at approximately right angles to the main part of the blank at a distance therefrom and splitting its free end to form a handle-socket, longitudinally slitting the main part of the plate from the opposite end thereof to near the shank and then forging the members thus formed into tines and a head portion, as and for the purposes set forth.

In testimony whereof I hereunto affix my signature, in the presence of two witnesses, this 25th day of February, 1902.

G. M. PORTMAN.

Witnesses:
CHAS. LUNDEN,
SONE LUNDEN.